(12) United States Patent
Wu et al.

(10) Patent No.: US 9,065,695 B2
(45) Date of Patent: Jun. 23, 2015

(54) METHOD AND APPARATUS OF CROSS-CORRELATION WITH APPLICATION TO CHANNEL ESTIMATION AND DETECTION

(71) Applicant: BlackBerry Limited, Waterloo (CA)

(72) Inventors: Huan Wu, Ottawa (CA); Yan Xin, Kanata (CA); Shouxing Qu, Groucester (CA); Arnold Sheynman, Northbrook, IL (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 14/482,176

(22) Filed: Sep. 10, 2014

(65) Prior Publication Data

US 2014/0376670 A1 Dec. 25, 2014

Related U.S. Application Data

(63) Continuation of application No. 13/537,455, filed on Jun. 29, 2012, now Pat. No. 8,837,644.

(51) Int. Cl.
*H04L 27/06* (2006.01)
*H04L 25/02* (2006.01)

(52) U.S. Cl.
CPC ........ *H04L 25/0258* (2013.01); *H04L 25/0226* (2013.01); *H04L 25/0212* (2013.01)

(58) Field of Classification Search
CPC .. H04L 7/042; H04L 27/2662; H04B 1/7093; H04B 7/0456; H04B 1/707
USPC .......... 375/343, 148, 340, 345, 373; 455/130, 455/218, 219, 513
See application file for complete search history.

(56) References Cited

U.S. PATENT DOCUMENTS

| | | | |
|---|---|---|---|
| 7,751,520 B1 * | 7/2010 | Zeng et al. | 375/373 |
| 2007/0091987 A1 * | 4/2007 | Cho | 375/148 |

* cited by examiner

*Primary Examiner* — Khai Tran
(74) *Attorney, Agent, or Firm* — Fleit Gibbons Gutman Bongini & Bianco P.L.

(57) ABSTRACT

The present disclosure provides for a method and apparatus for efficient cross-correlation between a reference sequence and a received sequence in a wireless communication system. The reference sequence includes a concatenation of sign-adjusted sub-sequences, the sign adjustments determined by a first sign sequence of a set of sign sequences. For example, the reference sequence may be an alternating concatenation of sign-adjusted Golay complementary pair sub-sequences. The received sequence is shifted to provide a plurality of time shifted sequences that are then cross-correlated with the sub-sequences to form a set of partial cross-correlations. The partial cross-correlations are sign-adjusted using the first sign sequence and combined to produce the cross-correlation between the reference sequence and the received sequence. The cross-correlations so produced may be used for channel signature (e.g. PHY-type) identification and/or channel impulse response estimation.

16 Claims, 10 Drawing Sheets

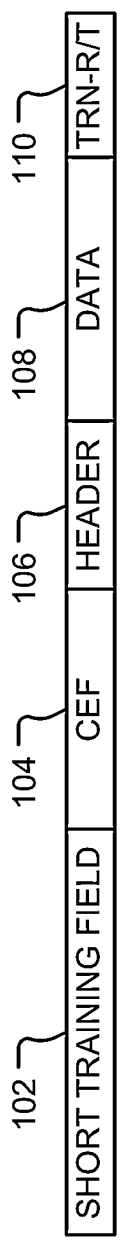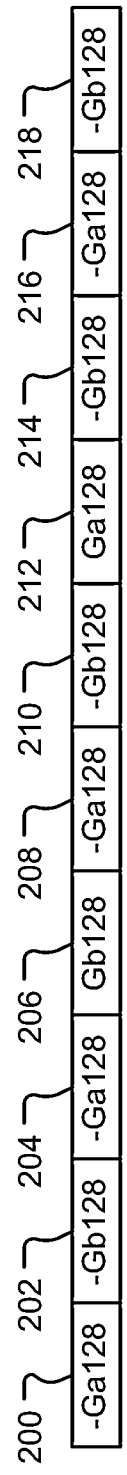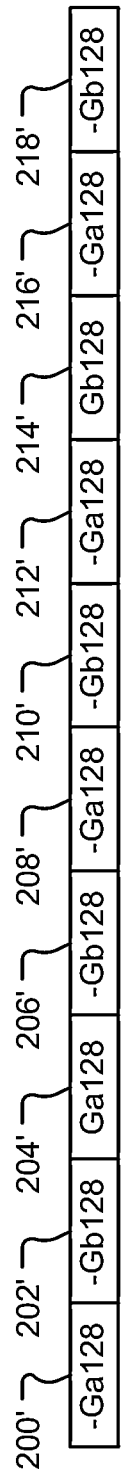
FIG. 1 (PRIOR ART)
FIG. 2A (PRIOR ART)
FIG. 2B (PRIOR ART)

US 9,065,695 B2

METHOD AND APPARATUS OF CROSS-CORRELATION WITH APPLICATION TO CHANNEL ESTIMATION AND DETECTION

PRIORITY CLAIM

This application is a continuation of U.S. patent application Ser. No. 13/537,455 filed on Jun. 29, 2012, that will issue as U.S. Pat. No. 8,837,644 on Sep. 16, 2014. This prior application, including the entire written description and drawing figures, is hereby incorporated into the present application by reference.

BACKGROUND

Training sequences are widely used in wireless communication systems in the form of well designed sequences or waveforms known to both the transmitter and the receiver. The training sequence (TS) is used mainly for the purpose of channel estimation, and may also carry other information (e.g., signalling or user information, etc.) that can be detected, typically blindly, on the receiver side. The ultimate goal for the design of the TS is to optimize the channel estimation and signal detection performance in the receiver for a given set of constraints (e.g., channel delay spread requirement, types of information carried over, expected operating signal-to-noise ratio and transmitter/receiver complexity, etc.). The IEEE 802.11ad specification, which provides a standard for the emerging WLAN/WPAN at the 60 GHz frequency band, defines a training signal called channel estimation field (CEF). FIG. 1 shows the frame structure of a Physical layer Protocol Data Unit (PPDU) 100 defined in the IEEE 802.11ad specification. The frame structure includes a short training field (STF) 102, a channel estimation field (CEF) 104, a header 106, a data packet 108 and a beamforming receiver/transmitter training (TRN-R/T) field 110. An automatic gain control (AGC) field may also be included. The channel estimation field (CEF) 104 is used for channel estimation and detection of modulation types used in header and data packets when they are transmitted over a physical layer of a network. For example, the modulation type may be orthogonal frequency division multiplexing (OFDM) or single carrier (SC). The modulation type is associated with the physical layer (PHY) type.

FIG. 2 illustrates the CEF sequences defined in the IEEE 802.11ad specification for wireless local area networks and wireless personal area networks. FIG. 2A shows the sequence for single carrier (SC) modulation and FIG. 2B shows the sequence 104 for orthogonal frequency division multiplexing (OFDM) modulation. The CEF sequence for SC modulation consists of a prefix sequence 200 which is a part of the STF 102, followed by eight concatenated, alternating, 128-bit Golay complementary sequences, 202, 204, 206, 208, 210, 212, 214 and 216, and a postfix sequence 218. The sequences Ga128 and Gb128 form a Golay complementary pair. Each sequence is modulated by a sequence of signs (+ or −). The prefix and postfix sequences (shown as shaded blocks in the figures) are cyclic extensions of the eight concatenated sequences. Similarly, the CEF sequence 104' for OFDM modulation, shown in FIG. 2B consists of a prefix sequence 200' which is also a part of the STF 102, followed by eight concatenated, alternating, 128-bit Golay complementary sequences, 202', 204', 206', 208', 210', 212', 214' and 216', and a postfix sequence 218'.

Use of the training sequences to estimate the channel impulse response or to identify the PHY-type requires the computation of cross-correlations between a received sequence and a set of reference signals. It is therefore advantageous for the cross-correlation computation to be performed efficiently.

BRIEF DESCRIPTION OF THE DRAWINGS

Exemplary embodiments of the present disclosure will be described below with reference to the included drawings such that like reference numerals refer to like elements and in which:

FIG. 1 shows the frame structure of a known Physical layer Protocol Data Unit (PPDU) for wireless local area networks;

FIGS. 2A and 2B illustrate known channel estimation field (CEF) sequences for wireless local area networks;

DETAILED DESCRIPTION

Figure 3:
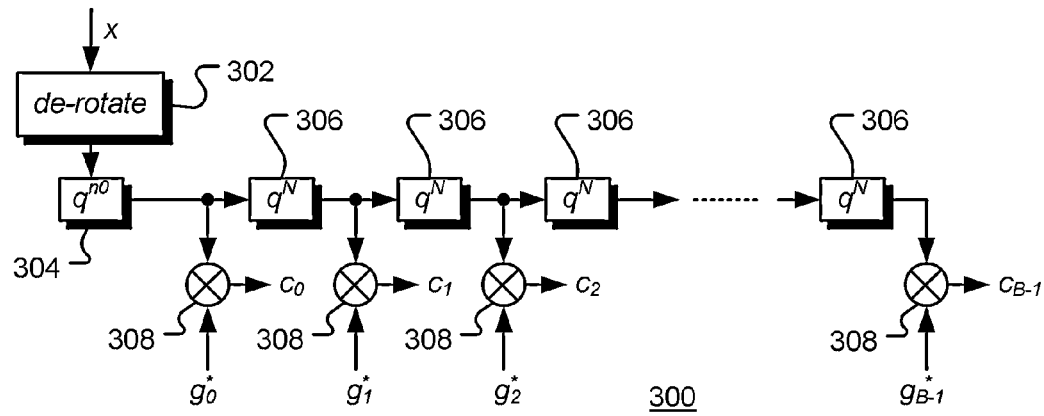
FIG. 3 is a block diagram of a system for computing partial cross-correlations, in accordance with exemplary embodiments of the present disclosure.

For simplicity and clarity of illustration, reference numerals may be repeated among the figures to indicate corresponding or analogous elements. Numerous details are set forth to provide an understanding of the illustrative embodiments described herein. The embodiments may be practiced without these details. In other instances, well-known methods, procedures, and components have not been described in detail to avoid obscuring the disclosed embodiments. The description is not to be considered as limited to the scope of the embodiments shown and described herein.

In accordance with some aspects of the present disclosure, there is provided an efficient method for determining cross-correlations between a set of reference sequences and a received sequence in a wireless communication system. Each reference sequence comprises a concatenation of sign-adjusted sub-sequences, the sign adjustments determined by a corresponding set of sign sequences. For example, the reference sequence may be an alternating concatenation of sign-adjusted Golay complementary pair sub-sequences.

The received sequence is shifted to provide a multiple time-shifted sequences that are cross-correlated with the sub-sequences to form a set of partial cross-correlations. The partial cross-correlations are sign-adjusted using the first sign sequence and combined to produce the cross-correlation between the reference sequence and the received sequence.

The sequence to be transmitted may be selected from a set of sequences. Herein, the selected sequence is said to identify a channel signature. The channel signature may be used to denote a feature of the channel, such the PHY type. For example, if the set consist of four sequences, there are four possible channel signatures. Cross-correlations with a set of reference sequences can be performed. This enables the channel signature of the received sequence to be identified by detecting the maximum cross-correlation with respect to a selected metric, such as a norm of the cross-correlations over a range of lags.

When the received sequence is received via a communication channel, the communication channel impulse response may be estimated from the cross-correlation between the reference sequence and the received sequence.

In accordance with further aspects of the present disclosure, there is provided a system for determining cross-correlations between a set of reference sequences and a received sequence in a wireless communication system, where each reference sequence comprises a concatenation of sign-adjusted sub-sequences. Shift modules shift the received sequence by an amount dependent upon the length of the sub-sequences to provide shifted received sequences. Corresponding correlators form a set of partial cross-correlations by correlating each shifted received sequences with a sub-sequence of the reference sequence. One or more combiners adjust the signs of the set of partial cross-correlations, in accordance with a corresponding sign sequence, and sum the sign adjusted partial correlations to provide the cross-correlations between the reference sequences and the received sequence.

Once computed, the partial cross-correlations may be used to compute cross-correlation with other reference sequences by adjusting the signs of the computed partial cross-correlations. This requires minimal additional computation.

In some embodiments, the reference sequence is a training sequence $s_{PHY}(k)$ and is selected to define a channel signature. In one embodiment, the channel signature corresponds to the channel type PHY. Each reference sequence is formed by combining a set of B blocks or sub-sequences $g_1(k)$ of length N (where $g_1(k)=0$ for $k<0$ or $k \geq N$), with a sequence of B signs $p_b^{PHY}$. The sequence can be written as:

$$s_{PHY}(k) = \sum_{b=0}^{B-1} p_b^{PHY} q^{-Nb} g_b(k), \quad (1)$$

where $p_b^{PHY}=\pm 1$ is the $b^{th}$ element of a sign sequence and q is a shift operator with the property $q^{-K}g(k) \square g(k-K)$. For example, $q^{-1}$ corresponds to a delay of one chip or element. The sequence $s_{PHY}(k)$ is a concatenation of B sub-sequences, each sign-adjusted by a sign $p_b^{PHY}$. The subscript or superscript 'PHY' may indicate that the sequence is associated with a particular channel signature, such as the PHY type.

The reference sequence may be extended to include prefix and postfix sequences.

In a wireless communication system, channel impulse response estimation and channel type detection (PHY-type detection) are both calculated by forming cross-correlations between a training (reference) sequence and a received signal. The periodic cross-correlation $C_{PHY}(n)$ between a received sequence x(n) (after de-rotation, if the transmitted sequence was rotated) and a reference sequence $s_{PHY}(k)$ is calculated as $$C_{PHY}(n) = \frac{1}{BN} \sum_k s_{PHY}^*(k) \cdot x(n_0 + n + k) = \frac{1}{BN} \sum_{k=0}^{B \times N - 1} s_{PHY}^*(k) \cdot x(n_0 + n + k), \quad (2)$$

where $n_0$ is the timing offset, the superposed star denotes the complex conjugate.

If the cross-correlation is to be computed for L lags, direct computation of the cross-correlation in equation (2) requires $B \times N \times L$ multiply-accumulate operations (MAC's) for each of the real and imaginary parts of x and for each PHY type. For example, for the sequences defined in the IEEE 802.11ad specification for wireless local area networks, B=8, N=128, L=128, and 2 PHY types are used. The total number of real multiply-accumulate operations required for direct computation of the cross-correlations is $B \times N \times L \times 2 \times 2 = 524,288$. This is a significant computation.

In accordance with one aspect of the present disclosure, improved method and apparatus are provided for computation of cross-correlations of the type shown in expression (2) for sequences of the form given in equation (1).

Substituting for the sequence $s_{PHY}(k)$ using expression (1) and rearranging allows expression (2) to be written as:

$$C_{PHY}(n) = \frac{1}{BN} \sum_{k'} \sum_{b=0}^{B-1} p_b^{PHY} q^{-Nb} g_b^*(k') \cdot x(n_0 + n + k') \quad (3)$$

$$= \frac{1}{BN} \sum_{k'} \sum_{b=0}^{B-1} p_b^{PHY} g_b^*(k' - Nb) \cdot x(n_0 + n + k').$$

Setting $k=k'-Nb$ gives $$C_{PHY}(n) = \frac{1}{BN} \sum_k \sum_{b=0}^{B-1} p_b^{PHY} g_b^*(k) \cdot x(n_0 + n + k + Nb) \quad (4)$$

$$= \frac{1}{BN} \sum_{b=0}^{B-1} p_b^{PHY} \sum_k g_b^*(k) \cdot q^{Nb} x(n_0 + n + k)$$

$$= \frac{1}{B} \sum_{b=0}^{B-1} p_b^{PHY} \cdot c_b(n)$$

where $c_b(n)$ is a partial correlation at lag n, given by $$c_b(n) = \frac{1}{N}\sum_k g_b^*(k) \cdot q^{Nb} x(n_0 + n + k) = \frac{1}{N}\sum_{k=0}^{N-1} g_b^*(k) \cdot x(n_0 + n + k + Nb). \quad (5)$$

The channel impulse response (CIR) is given by $$H = \underset{C_{PHY}}{\operatorname{argmax}}\{\|C_{PHY}\|\}, \quad (6)$$

which is the cross-correlation for which some metric, denoted by $\|\cdot\|$, of the cross-correlation is maximized. The channel impulse response comprises a number of tap values at different lags. The metric may be, for example, the maximum tap value, the sum of squares of tap values for a range of lags, or some other measure. The CIR for which the metric is maximized is selected.

FIG. 3 is a block diagram of an illustrative embodiment of a system 300 for computing the partial cross-correlations $c_b(n)$ defined in equation (5). The received sequence x is de-rotated, if required, in de-rotational module 302 and shifted by $n_0$ (a timing offset) in shift unit 304 before being passed to a cascade of B−1 shift units 306. Each shift unit 306 provides a shift of N sample or elements. At each stage in the cascade of shift units, the shifted received sequence is cross-correlated with the conjugate of a sequence $g_b$ in cross-correlation modules 308. Each cross-correlation module 308 produces one of the B partial correlations $c_b(n)$ as output. In this way, all of the B partial correlations $c_b(n)$ are computed.

Once the B partial correlations $c_b(n)$ have been computed, as in equation (5), the cross-correlation for each PHY type can be computed as in equation (4), using the sign sequence corresponding to a channel signature, such as the PHY type. Equation (5) requires only B×L×2 accumulate operations (additions or subtractions).

For example, for the sequences defined in the IEEE 802.11ad specification for wireless local area networks, B=8, N=128, L=128, and two PHY types are used. The total number of operations required for computations of the partial cross-correlations is B×N×L×2=262,144 real multiply-accumulate operations for the 8 terms of equation (5), plus B×L×2=2048 accumulate operations for each PHY type for equation (4). This is a saving of almost 50% in computation compared to the direct method.

The benefit of the disclosed approach is even greater when more than two PHY types are in use. For example, with eight PHY types, the disclosed approach uses approximately ⅛ of the computation of the direct approach.

In some embodiments, the sub-sequences $g_1(k)$ are alternating complementary pair sequences, such as Golay complementary pairs, for which $$g_b(k) = \begin{cases} g_A(k), & b = \text{odd} \\ g_B(k), & b = \text{even} \\ 0 & \text{for } k < 0 \text{ and } k \geq N \end{cases} \quad (7)$$

In such embodiments, the cross-correlation can be written as $$C_{PHY}(n) = \frac{1}{B}\sum_{b=0}^{B/2-1} p_{2b}^{PHY} \cdot c_{2b}(n) + \frac{1}{B}\sum_{b=0}^{B/2-1} p_{2b+1}^{PHY} \cdot c_{2b+1}(n), \quad (8)$$

where the odd and even partial cross-correlations are $$c_{2b+1}(n) = \frac{q^N}{N}\sum_{k=0}^{N-1} g_A^*(k) \cdot q^{2Nb} x(n_0 + n + k) = \quad (9)$$

$$\frac{q^{-N}}{N}\sum_k q^{-2Nb} g_A^*(k) \cdot x(n_0 + n + k)$$

$$c_{2b}(n) = \frac{1}{N}\sum_{k=0}^{N-1} g_B^*(k) \cdot q^{2Nb} x(n_0 + n + k) =$$

$$\frac{1}{N}\sum_k q^{-2Nb} g_B^*(k) \cdot x(n_0 + n + k).$$

It is noted that the CEF's defined in the IEEE 802.11ad specification can be considered as the sequences constructed with sign sequences of length B=8, $p^{SC}=(-,-,+,-,-,+,-,-)$ and $p^{OFDM}=(-,+,-,-,-,-,+,-)$, and a pair of binary Golay complementary sequences $g_A$=Ga128 and $g_B$=Gb128 with length N=128. The sequences are cyclically extended with a length N prefix and a length N postfix, making it possible to computer the periodic correlations.

Figure 4:
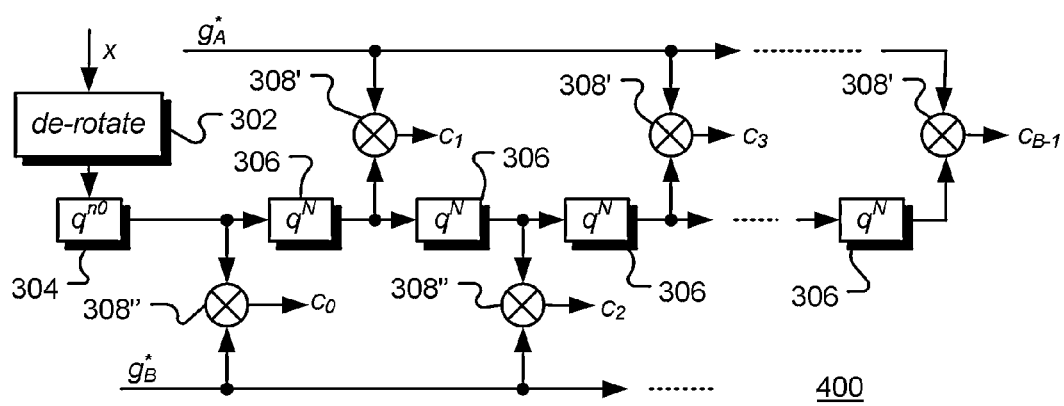
FIG. 4 is a block diagram of a further system for computing the partial cross-correlations, in accordance with exemplary embodiments of the present disclosure.

FIG. 4 is a block diagram of an exemplary embodiment of a partial correlator 400 for computing the partial cross-correlations $c_b(n)$ defined in equation (9). As described above with reference to FIG. 3, the received sequence x is de-rotated in de-rotational module 302 and shifted by $n_0$ in shift unit 304 before being passed to a cascade of B−1 shift units 306. Each shift unit 306 provides a shift of N samples or chips. At each even stage in the cascade of shift units 306, the shifted received sequence is cross-correlated with the sequence $g_B$ in cross-correlation modules 308'. At each odd stage in the cascade of shift units 306, the shifted received sequence is cross-correlated with the sequence $g_A$ in cross-correlation modules 308". In this way, all of the B partial correlations $c_b(n)$ are computed.

When the received signal is complex, each of the B stages requires N×2 real multiply-accumulate operations for each of the L lags, for a total of B×N×L×2 real multiply-accumulate operations.

Figure 5:
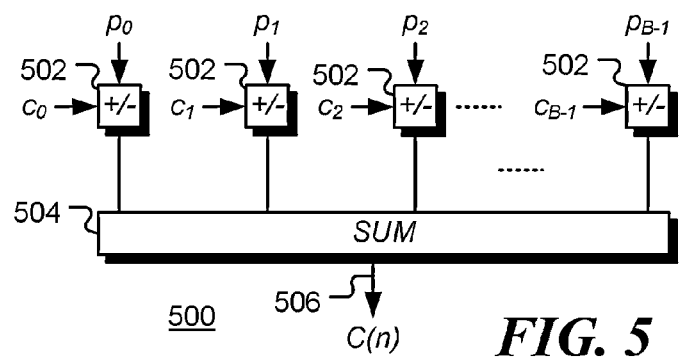
FIG. 5 is a block diagram of a system for computing a cross-correlation from a set of partial cross-correlations, in accordance with exemplary embodiments of the present disclosure.

FIG. 5 is a block diagram of an exemplary embodiment of a combiner 500 for computing a cross-correlation C for a single PHY type from a set of partial cross-correlations $c_b(n)$, defined in equation (5) or equation (9), and a sign sequence $p=(p_0, p_1, p_2, \ldots, p_{B-1})$. For each lag n, the sign of partial cross-correlation $c_b(n)$ is adjusted in sign adjustment unit 502 dependent upon the corresponding sign $p_b$ in the sign sequence. The sign-adjusted partial sums are accumulated in summation module 504 to produce the final cross-correlation $C(n)$, denoted as 506. B×L real operations, either addition or subtraction, are required for each PHY type. In contrast, a direct approach requires B×N×L×2 operations for each PHY type.

In one exemplary embodiment, the system of FIG. 5 may be used in turn for each PHY type to enable serial operation. In a further embodiment, the system is duplicated to enable parallel operation in software or hardware of a combination thereof.

The computation reduction is achieved because the number of cross-correlations does not increase with number of reference sequences. For example, the number of cross-correlations does not increase with the number of PHY types. Apart from a few additional ADD operations, the total number of operations is almost independent of the number of PHY types.

In a communication system, another advantage of the efficient correlator disclosed above is that it may share the same hardware implementation as the beacon initial acquisition and frame synchronization tasks, which utilize the cross-correlations of sub-sequences with the short training field (STF).

It is noted that the channel estimation for SC-PHY can also be applied for control-PHY in IEEE 802.11ad.

The above discussion assumes that the sampling rate at receiver is one sample per chip, i.e., the over-sampling ratio (OSR) is one. The correlator will be referred to as a chip correlator in the sequel. However, the chip correlator may also be used to provide efficient cross-correlation in receivers where the over-sampling-ratio (OSR) is equal to or greater than one. In the case of OSR=R, the receiver can be constructed with R processing branches, each consisting of a correlator at the chip rate (one sample per chip). The outputs from the multiple correlators can be combined accordingly for the underlying task. This is briefly discussed in the following.

PHY type can be detected by comparing certain metrics derived from the correlations, e.g., maximum of a channel tap power, maximum of channel energy (integration of channel tap power) within a channel window, etc. In some embodiments, the metric comprises a norm of the correlation over a range of lags. The norm may be the maximum absolute value (the infinity or maximum norm), the p-norm, the sum of squares, or some other norm.

Figure 6:
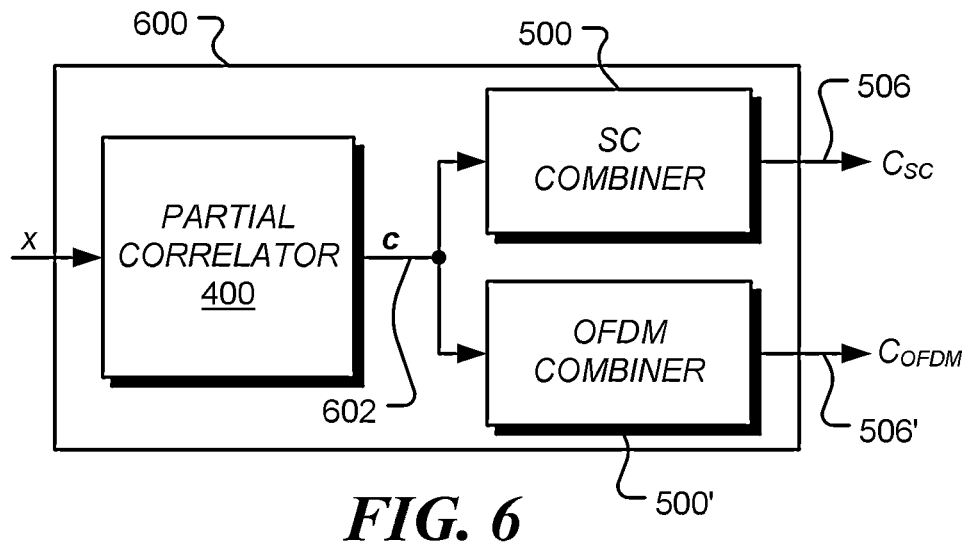
FIG. 6 is a block diagram of a PHY-type detector, in accordance with an illustrative embodiment of the disclosure.

FIG. 6 is a block diagram of a chip correlator 600 in accordance with an illustrative embodiment of the disclosure. The chip correlator 600 employs a partial correlator 400. In this embodiment, two reference sequences are used. The combiner 500 uses the sign sequence corresponding to a single carrier (SC) PHY type and produces the correlation $C_{SC}$ as output 506, while the combiner 500' uses the sign sequence corresponding to orthogonal frequency division multiplexing (OFDM) PHY type and produces the correlation $C_{OFDM}$ as output 506'. In general, a combiner is used for each reference sequence. All combiners use the same set of partial correlations, providing an efficient system for computing the correlations with the reference sequences.

Figure 7:
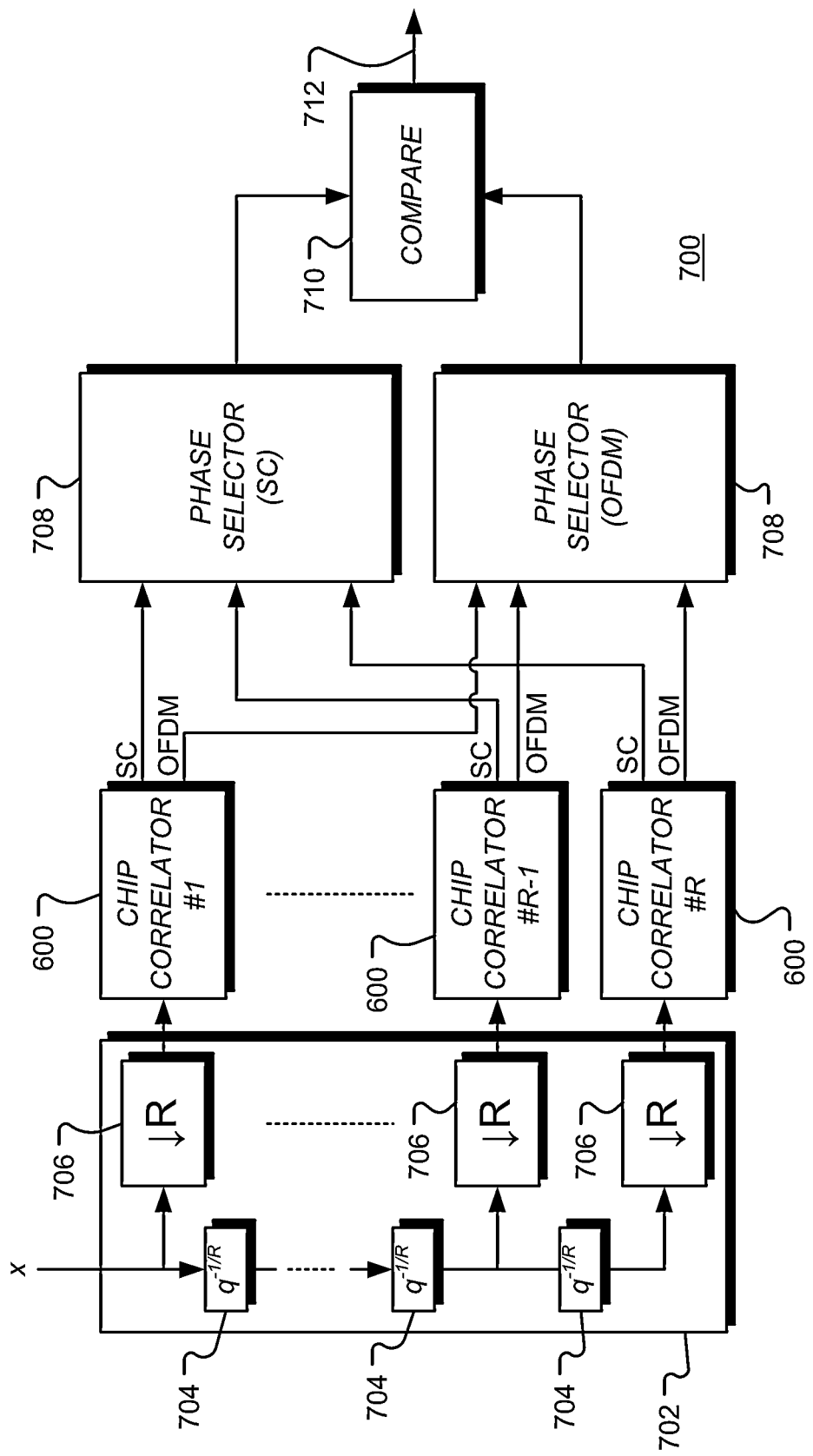
FIG. 7 is a block diagram of a PHY-type detector for an oversampled input, in accordance with an illustrative embodiment of the disclosure.

FIG. 7 is a block diagram of a PHY type detector 700 for application where the received sequence is over-sampled with an over-sampling-ratio (OSR) greater than or equal to 1. In the figure, the OSR is denoted as R. The detector 700 comprises a series-to-parallel converter 702 that takes the over-sampled received signal x as input and generates R outputs at the chip rate, each output corresponding to one phase of the input. In the exemplary embodiment shown, the series-to-parallel converter 702 comprises a cascade of R delay units 704. Each delay unit 704 delays the received input sequence x by one sampling period at the over-sampled rate. The outputs from the delay units are then sub-sampled by a factor R in sub-samplers 706 to obtain R chip-rate signals. Each chip-rate signal is passed to a chip correlator 600. One chip correlator 600 is used for each of the R phases. In the exemplary embodiment shown, the PHY type detector 700 is configured to select between just two PHY modulation types—single carrier (SC) and orthogonal frequency division multiplexing (OFDM). Thus, each chip correlator 600 provides two outputs: SC obtained by using the SC sign sequence and OFDM obtained by using the OFDM sign sequence. For each PHY type, the outputs from the R chip correlators 600 are compared in a phase selector 708 to select the strongest phase (according to a selected metric). Finally, the winning SC phase and the winning OFDM phase are compared in comparator 710 and the output PHY type 712 is determined as the stronger of the two types.

Figure 8:
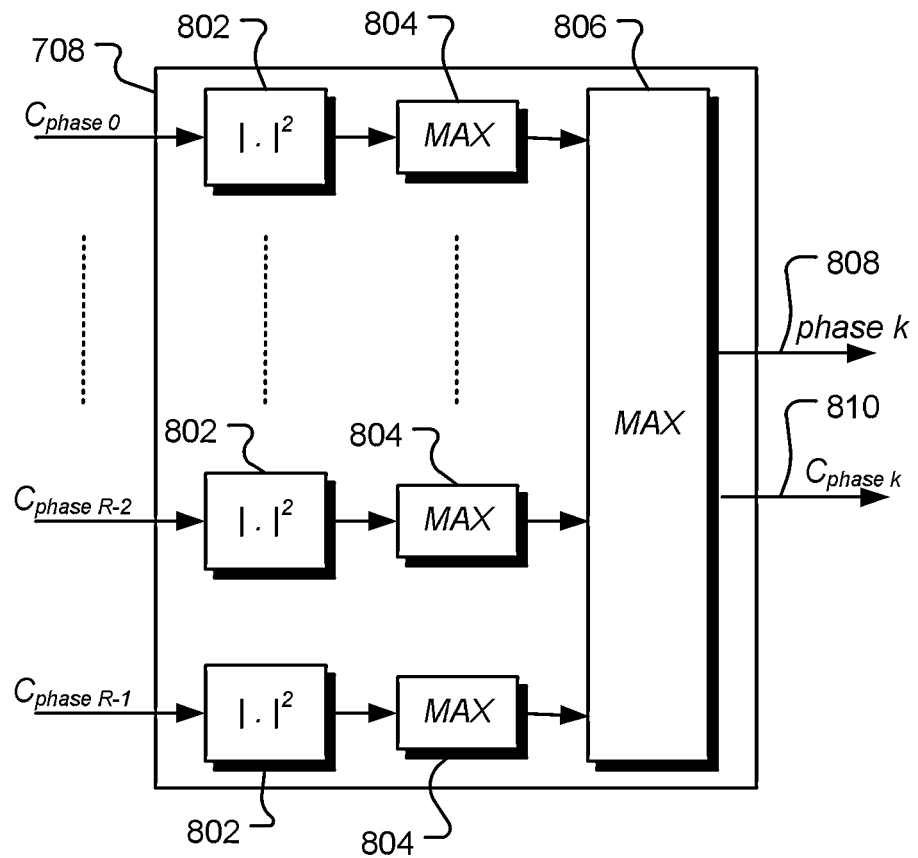
FIG. 8 is a block diagram of a phase selector, in accordance with exemplary embodiments of the disclosure.

FIG. 8 is a block diagram of an exemplary phase selector 708. The phase selector receives R phase-adjusted cross-correlations $C_{phase\ 0}, C_{phase\ 1}, \ldots, C_{phase\ R-2}, C_{phase\ R-1}$ as inputs. For each phase, a metric is determined. For example, at block 802 the square of the cross-correlations in determined, and at block 804, the maximum value in a given window is detected. The window may be fixed or adapted. The metrics for each phase are then compared in block 806 to determine the phase having the largest metric. The phase number, k (808) and/or the value of the metric, $\|C_{phase\ k}\|$ (810) are provided as outputs.

Figure 9:
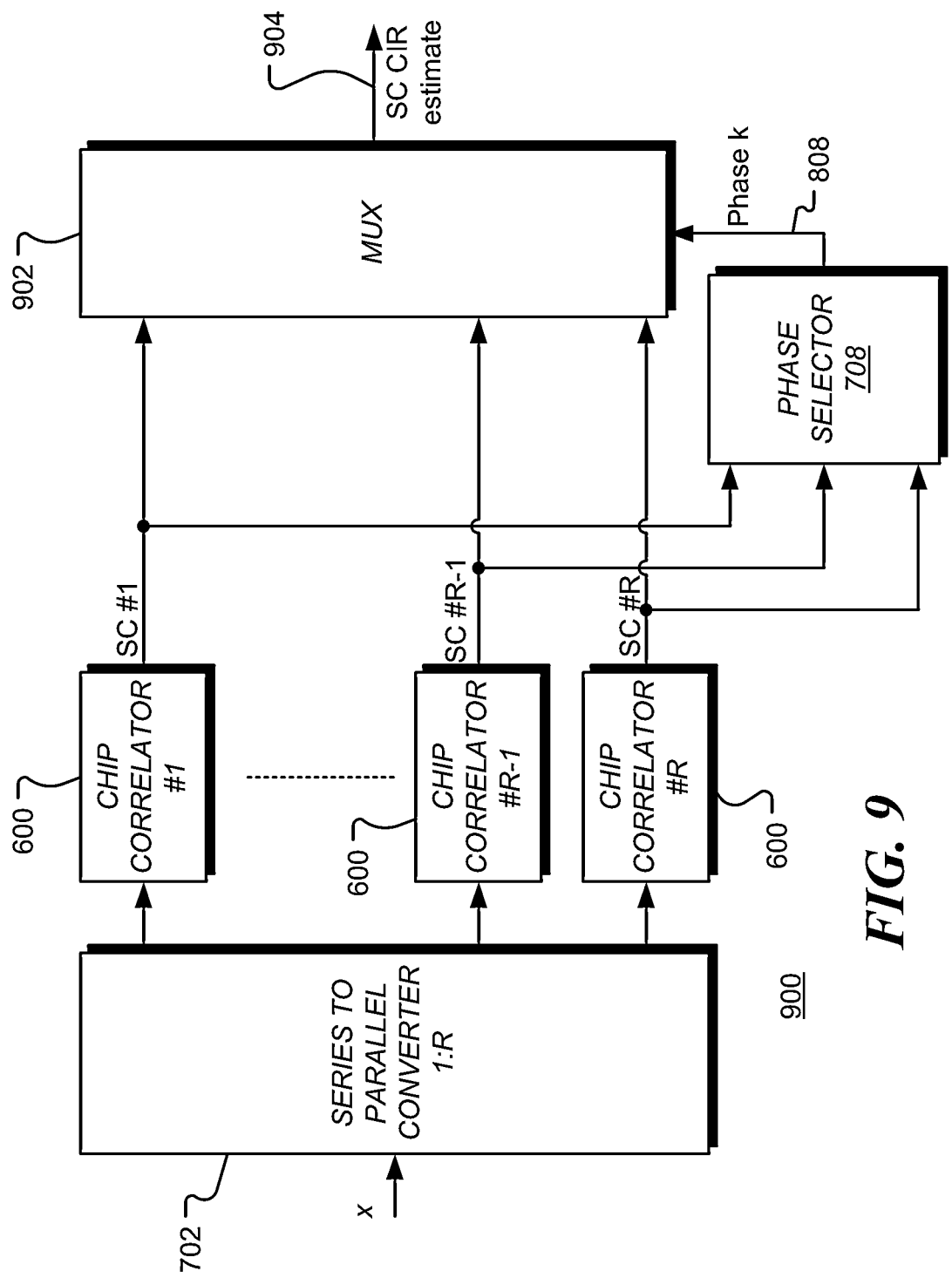
FIG. 9 is a block diagram of a system for SC-PHY channel estimation, in accordance with exemplary embodiments of the disclosure.

FIG. 9 is a block diagram of a system 900 for SC-PHY channel estimation, in accordance with exemplary embodiments of the disclosure. The R parallel outputs from series-to-parallel converter 702 are passed to chip correlators 600. The phase selector 708 is responsive to the SC cross-correlation outputs from the R chip correlations 600 and outputs the phase 808 of the strongest correlation branch (i.e., the best sampling phase amongst the OSR phases). The phase is then used in branch selector or multiplexer 902 to select the strongest branch. The cross-correlation of the strongest branch is output as the SC channel impulse response (CIR) estimate 904.

Figure 10:
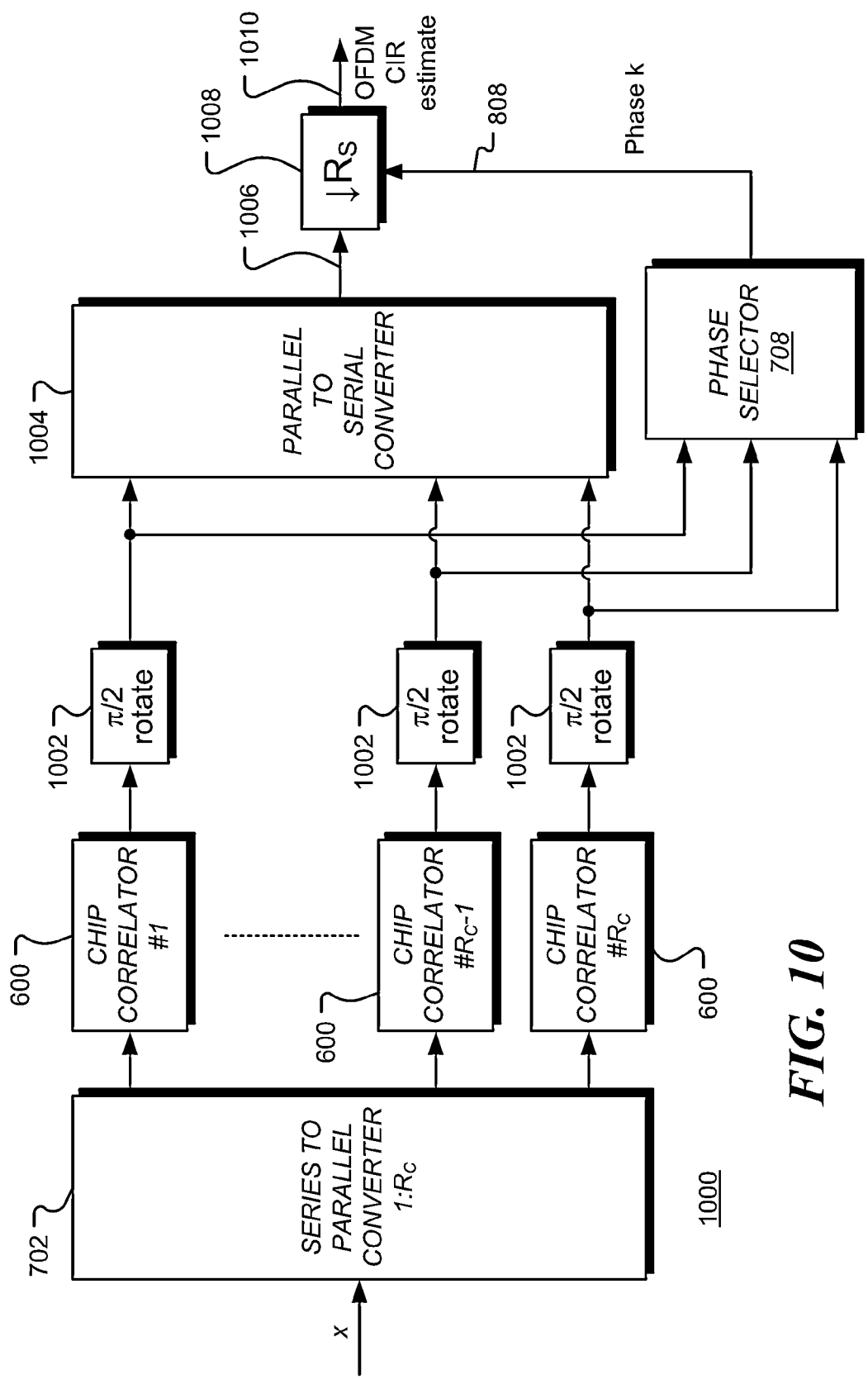
FIG. 10 is a block diagram of a system for OFDM-PHY channel estimation, in accordance with exemplary embodiments of the disclosure.

FIG. 10 is a block diagram of a system 1000 for OFDM-PHY channel estimation, in accordance with exemplary embodiments of the disclosure. The input x is converted to $R_C$ parallel phases in series-to-parallel converter 702, where $R_C$ is the over sampling ratio for the preambles. The cross-correlations for each phase are calculated in chip correlators 600. Compared to SC-PHY channel estimation, an extra π/2-rotation, shown as block 1002, is used after the chip correlator because the OFDM data/header symbols are not rotated in the IEEE 802.11ad specification. The cross correlations are serialized in parallel to serial converter 1004 to generate an original (over-sampled) rate signal 1006. The strongest phase 808 is determined in phase selector 708 and is used to control the timing of decimator 1008. The decimator 1008 provides the serial correlation 1010 as output, the serial correlation corresponding to the CIR estimate. This enables sample rate conversion, which may be required if the OFDM symbol rate is different from the CEF chip rate. Sample rate conversion is provided by decimating the serialized samples of $R_C$ parallel branches by a factor $R_S$, where $R_S$ is the oversampling ratio for OFDM-PHY. For example, $R_C$ and $R_s$ are chosen to have $R_C:R_S=3:2$ for IEEE802.11ad so that the rate convertor is simply a decimator as shown in FIG. 10.

Figure 11:
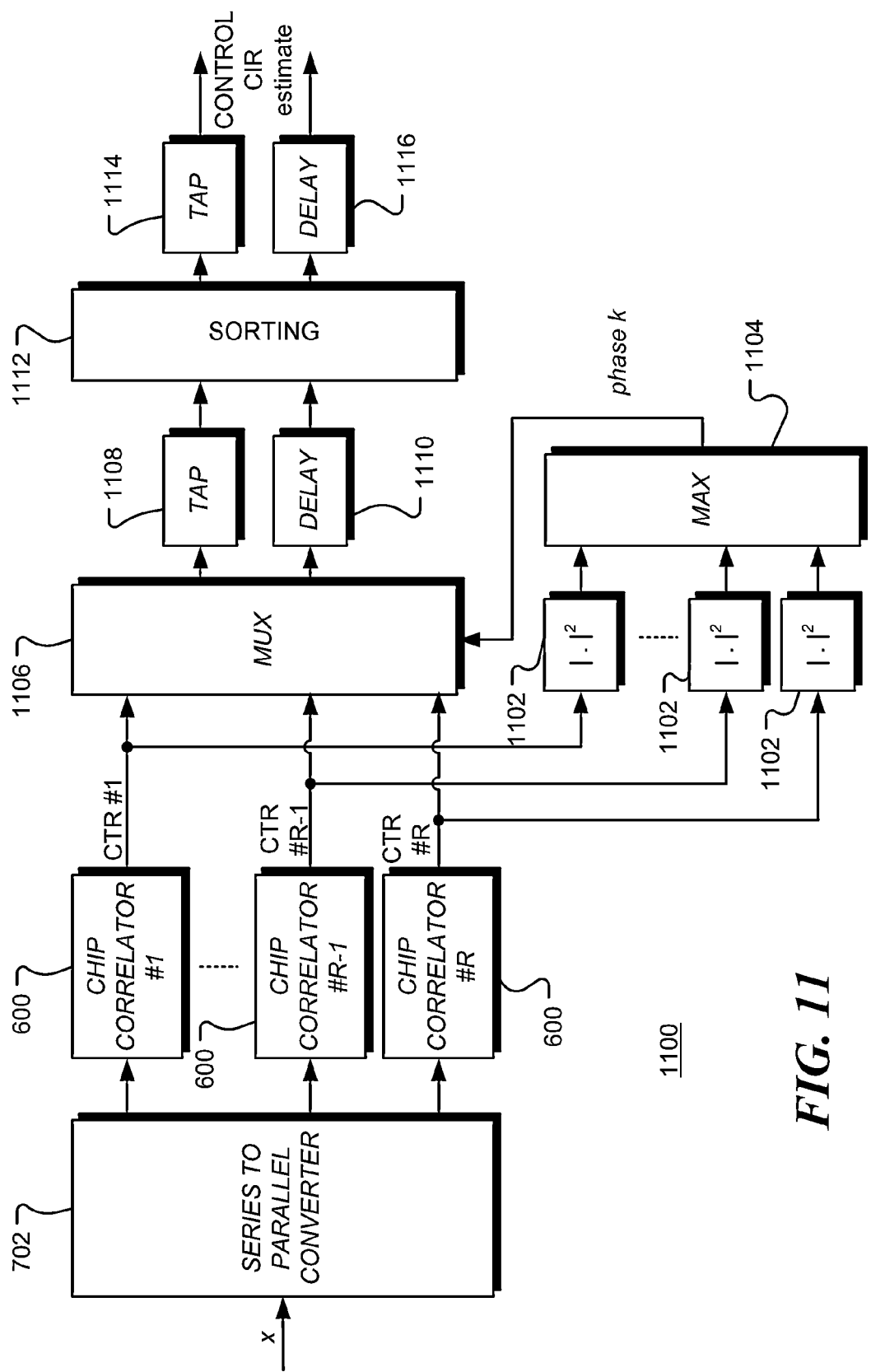
FIG. 11 is a block diagram of a system for control-PHY channel estimation, in accordance with exemplary embodiments of the disclosure.

FIG. 11 is a block diagram of a system 1100 for control-PHY channel estimation, in accordance with exemplary embodiments of the disclosure. The input x is converted to R parallel phases in series-to-parallel converter 702. The cross-correlations for each phase are calculated in chip correlators 600, using the appropriate sign sequence, to generate cross-correlations CTR #1, CTR #2, . . . , CTR #R−1. The strongest tap/phase, phase k, is selected from the R correlation outputs for each chip using power modules 1102 and maximum module 1104. The strongest phase k is used to control multiplexer 1106 to select tap 1108 and delay 1110, which are passed to sorting module 1112. The sorting module 1112 outputs the strongest tap 1114 and its corresponding delay 1116. These may be used to assist a RAKE receiver for control-PHY processor.

The efficient cross-correlation technique disclosed has numerous applications, including channel estimation and PHY type detection, for which examples are provided above.

Figure 12:
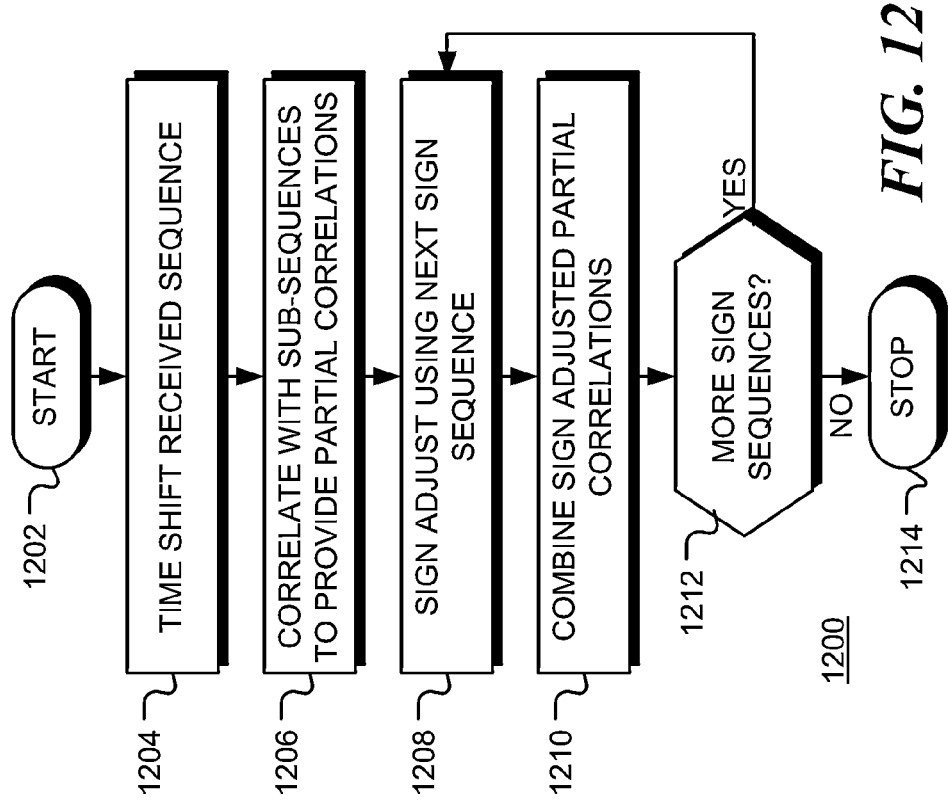
FIG. 12 is a flow chart of a method for cross-correlation between a reference sequence and a received sequence in a wireless communication system, in accordance with an illustrative embodiment of the disclosure.

FIG. 12 is a flow chart 1200 of a method for cross-correlation between a reference sequence and a received sequence in a wireless communication system, in accordance with an illustrative embodiment of the disclosure. As described in equation (1) above, the reference sequence includes a concatenation of sign-adjusted sub-sequences, the sign adjustments determined by a first sign sequence of a set of sign sequences. The sequence may be augmented by prefix and/or postfix sequences. Following start block 1202, the received sequence is time shifted to provide a number of time-shifted sequences at block 1204. The time-shifted sequences are correlated with the sub-sequences at block 1206, as described in equation (5), to form a set of partial cross-correlations $c_b$. The partial cross-correlations are then sign-adjusted at block 1208 and combined at block 1210 to produce the cross-correlations between the reference sequence and the received sequence, as described in equation (4) above. For channel estimation, the sign-adjustments are made in accordance with the first sign sequence. For PHY type estimation, the method is performed for each sign sequence of the set of sign sequences. Once the correlations have been found for the chosen sign sequences, as depicted by the negative branch from decision block 1212, the method terminates at block 1214. Otherwise, as depicted by the positive branch from decision block 1212, flow continues to block 1208.

Figure 13:
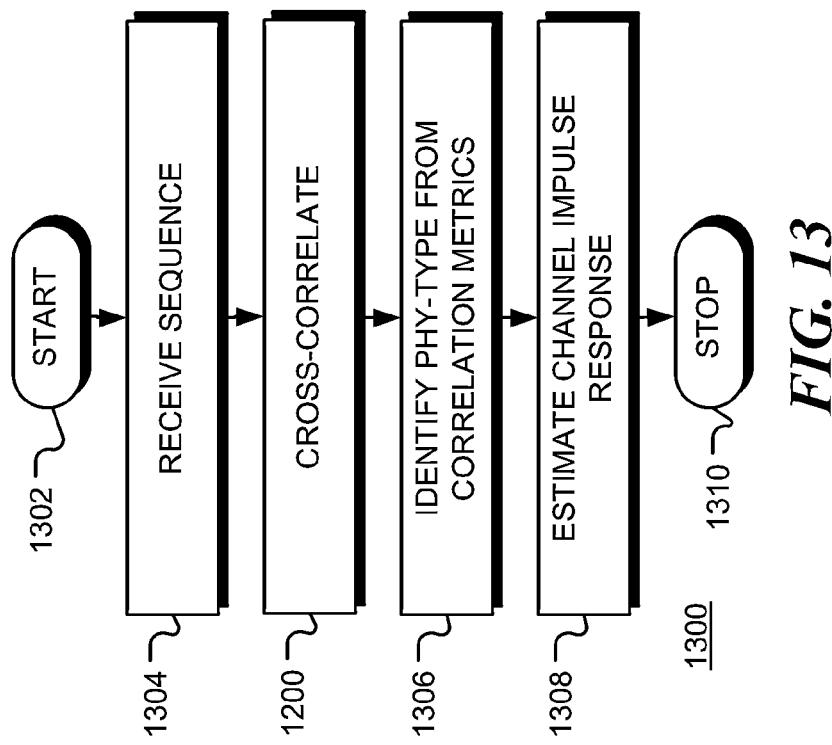
FIG. 13 is a flow chart of a method for channel impulse response estimation and PHY-type identification in a wireless communication system, in accordance with exemplary embodiments.

FIG. 13 is a flow chart 1300 of a method for channel impulse response estimation and PHY-type identification in a wireless communication system, in accordance with exemplary embodiments. Following start block 1302, an input sequence is received at block 1304. At block 1200, the received sequence is correlated with the set of PHY type reference sequences, as shown in FIG. 12. A metric is determined for each cross-correlation and the PHY type is detected as the PHY type having the largest metric. The sign sequence used to generate the received sequence is identified as the sign-sequence for which the metric is maximized at block 1306. The cross-correlation of the identified sequence with the received sequence is then used to estimate the channel impulse response at block 1308. The method terminates at block 1310. In this way, the PHY type is identified and the channel impulse response is estimated. When more than one PHY type is used, the disclosed method uses fewer processor resources than when a direct computation of cross-correlation is used.

Figure 14:
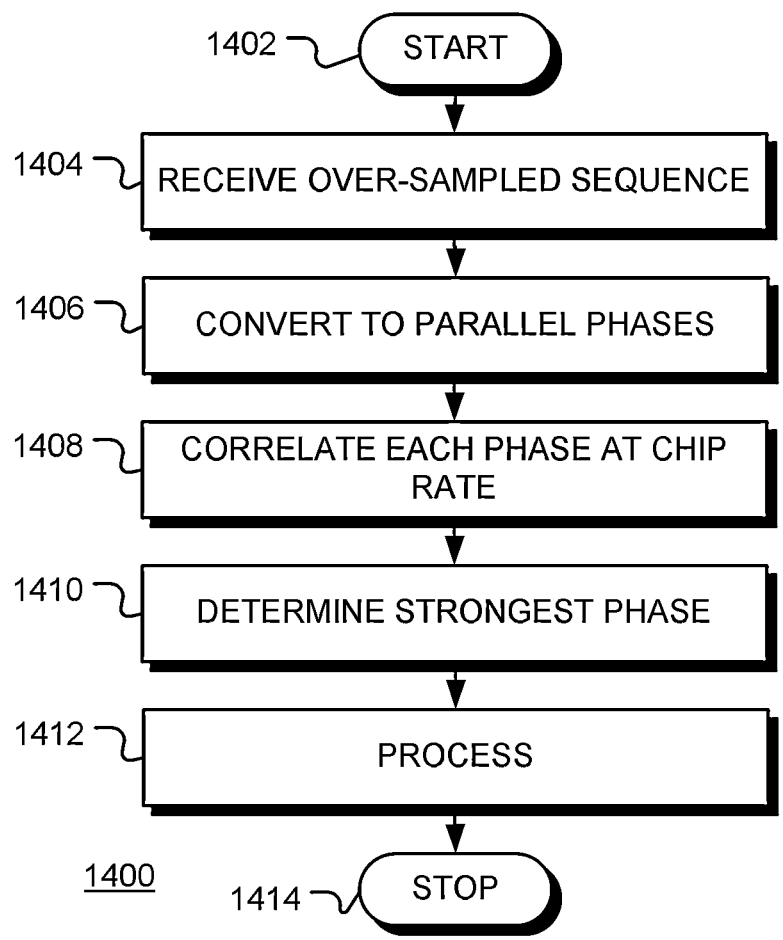
FIG. 14 is a flow chart of a further method for cross-correlation between a reference sequence and a received sequence in a wireless communication system, in accordance with an illustrative embodiment of the disclosure.

FIG. 14 is a flow chart 1400 of a further method for cross-correlation between a reference sequence and a received sequence in a wireless communication system, in accordance with an illustrative embodiment of the disclosure. The method described above with reference to FIG. 12 provides for efficient correlation computation at the chip or bit rate. Flow chart 1400 describes how multiple chip-rate correlators may be used to provide correlations for over-sampled sequences. Following start block 1402 in FIG. 14, an over-sampled sequence is received at block 1404. At block 1406, the over-sampled sequences is converted into R parallel sequences, at the chip rate, with different phases, where R is the over sampling ratio. The sequences are offset from one another by one high-rate sample, and so each chip-rate sequence corresponds to different phase of the received sequence. At block 1408, each of the R chip-rate phases is correlated, as described above, with a reference sequence of the set of reference sequences. At block 1410, the metrics of the correlations for each phase are compared and the strongest phase is determined. This enables the received sequence to be bit-aligned with the sampling process of the receiving device. Once the received sequence and the correlations have been bit-aligned they may be processed at block 1412. The processing may be for channel impulse response estimation, PHY-type identification or other processing. The method terminates at block 1414.

Figure 15:
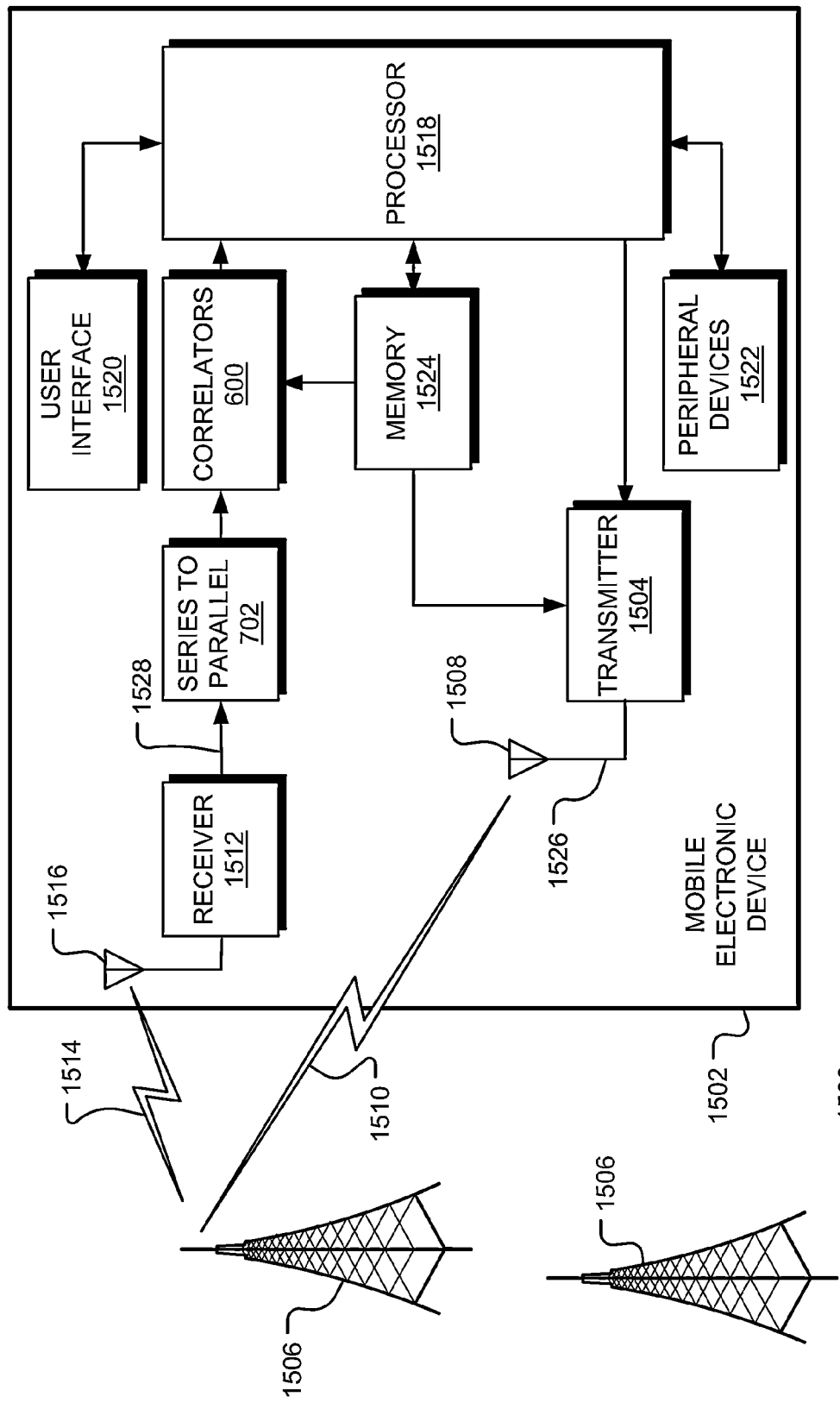
FIG. 15 is a block diagram of a communication system, in accordance with exemplary embodiments of the disclosure.

FIG. 15 is a block diagram of a communication system 1500, in accordance with exemplary embodiments of the disclosure. The communication system 1500 comprises an electronic device 1502, such as a mobile telephone, wireless electronic device, PDA, tablet computer, notebook computer or handheld electronic device, for example. Transmitter 1504 of the mobile electronic device 1502 communicates with a base station communication tower 1506 of a network via antenna 1508 and outgoing propagation path 1510. Receiver 1512 of the mobile electronic device 1502 communicates a base station communication tower 1506 via incoming propagation path 1514 and antenna 1516. The mobile electronic device 1502 includes a processor 1518 that is operatively coupled a user interface 1520 and to peripheral devices 1522. The user interface 1520 may include a display, a keyboard, a microphone, a loudspeaker, a motion sensor, an orientation sensor, a motion generator, a touch device and/or other user controls. The peripheral devices 1522 may include a SIM card, a battery, input/output ports, a near field communication port, a flash memory interface, and other devices. Memory 1524 provides data and program memory for the processor 1518, and, optionally, correlators 600. For example, the memory 1524 may include a non-transient memory for storing the sub-sequences $g_1(k)$ and the sign sequences $p_b^{PHY}$. In operation, a signal frame of outgoing signal 1526 includes a training sequence consisting of sign-modulated, interleaved sub-sequences. In one embodiment, an incoming signal 1528 is oversampled and passed to serial-to-parallel converter 702 to produce different phases that are, in turn, passed to a set of correlators 600, where they are correlated with the reference sequences. Channel impulse response estimation, channel signature identification is performed by processor 1518. Here, the serial-to-parallel converter 702 and the correlators 600 are shown is as separated modules. They may be implemented using a programmed processor, field programmable circuits, custom circuits or other means. In some embodiments their functions may be performed by processor 1518.

The methods described herein may be implemented in hardware or on a programmed processor, or a combination thereof. Further, the methods are well suited to implementation on a parallel processor.

The implementations of the present disclosure described above are intended to be merely exemplary. It will be appreciated by those of skill in the art that alterations, modifications and variations to the illustrative embodiments disclosed herein may be made without departing from the scope of the present disclosure. Moreover, selected features from one or more of the above-described embodiments may be combined to create alternative embodiments not explicitly shown and described herein.

It will be appreciated that any module or component disclosed herein that executes instructions may include or otherwise have access to non-transient and tangible processor readable media such as storage media, computer storage media, or data storage devices (removable or non-removable) such as, for example, magnetic disks, optical disks, flash memory devices or tape data storage. Computer storage media may include volatile and non-volatile, removable and non-removable media implemented in any method or technology for storage of information, such as processor readable instructions, data structures, program modules, or other data.

Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the server, any component of or related to the network, backend, etc., or accessible or connectable thereto. Any application or module herein described may be implemented using computer readable/executable instructions that may be stored or otherwise held by such computer readable media.

The present disclosure may be embodied in other specific forms without departing from its spirit or essential characteristics. The described example embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method for determining a cross-correlation between a reference sequence and a received sequence in a wireless communication system, the reference sequence comprising a set of sub-sequences that have been sign-adjusted and concatenated, the sign adjustments determined by a first sign sequence, the method comprising:
    oversampling the received sequence compared to a chip rate of the received sequence;
    forming a plurality of parallel chip-rate phases from the oversampled received sequence;
    cross-correlating the plurality of parallel chip-rate phases with the reference sequence to provide a plurality of correlations;
    determining the phase of a strongest correlation of the plurality of correlations in accordance with a metric; and
    processing the plurality of correlations dependent upon the phase of the strongest correlation.

2. The method of claim 1, where the reference sequence comprises a set of sub-sequences that have been sign-adjusted and concatenated, the sign adjustments determined by a first sign sequence, and where cross-correlating the plurality of parallel chip-rate phases with the reference sequence to provide the plurality of correlations comprises:
    shifting the received sequence to provide a plurality of time shifted sequences;
    cross-correlating the plurality of time shifted sequences with sub-sequences of the set of sub-sequences to form a set of partial cross-correlations;
    sign-adjusting the partial cross-correlations using the first sign sequence; and
    combining the sign-adjusted partial cross-correlations to produce the cross-correlation between the reference sequence and the received sequence, where the cross-correlation is used by the wireless communication system to facilitate wireless communication.

3. The method of claim 1, where the reference sequence comprises an alternating concatenation of sign-adjusted Golay complementary pair sub-sequences.

4. The method of claim 1, where processing the plurality of correlations comprises:
    selecting a correlation of the plurality of correlations having the strongest metric.

5. The method of claim 1, where processing the plurality of correlations comprises:
    outputting the metric of the correlation of the plurality of correlations having the strongest metric.

6. The method of claim 1, where processing the plurality of correlations comprises:
    converting the parallel correlations to a serial correlation at the oversampled rate; and
    sub-sampling the serial correlation dependent upon the phase of the strongest correlation of the plurality of correlations.

7. The method of claim 1 where the received sequence is received via a communication channel, the method further comprising:
    estimating an impulse response of the communication channel from the cross-correlation between the reference sequence and the received sequence.

8. A method for determining a cross-correlation between a reference sequence and a received sequence in a wireless communication system, the reference sequence comprising a set of sub-sequences that have been sign-adjusted and concatenated, the sign adjustments determined by a first sign sequence, the method comprising:
    shifting the received sequence to provide a plurality of time shifted sequences;
    cross-correlating the plurality of time shifted sequences with sub-sequences of the set of sub-sequences to form a set of partial cross-correlations;
    sign-adjusting the partial cross-correlations using the first sign sequence; and
    combining the sign-adjusted partial cross-correlations to produce the cross-correlation between the reference sequence and the received sequence, where the cross-correlation is used by the wireless communication system to facilitate wireless communication,
where the reference sequence comprises an alternating concatenation of sign-adjusted Golay complementary pair sub-sequences.

9. A system operable to determine a cross-correlation between a reference sequence and a received sequence in a wireless communication system, the reference sequence comprising a set of sub-sequences that have been sign-adjusted and concatenated, the sign adjustments determined by a first sign sequence of a plurality of sign sequences, the system comprising:
    a plurality of shift modules operable to shift the received sequence by an amount dependent upon the length of the sub-sequences to provide a plurality of shifted received sequences;
    a plurality of correlators operable to form a plurality of partial cross-correlations by correlating a shifted received sequence with a sub-sequence of the set of sub-sequences; and
    at least one combiner operable to adjust signs of the plurality of partial cross-correlations in accordance with the first sign sequence and sum the sign adjusted partial correlations to provide the cross-correlation between the reference sequence and the received sequence, where the cross-correlation is used by the wireless communication system
where the reference sequence comprises an alternating concatenation of sign-adjusted Golay complementary pair sub-sequences.

10. The system of claim 9, where the plurality of shift modules comprises a series cascade of shift modules each operable to shift the received sequence by the length of the sub-sequences.

11. An electronic device operable to determine a cross-correlation between a set of M reference sequences and a received sequence in a wireless communication system, each reference sequence of the set of reference sequences comprising a concatenation of sign-adjusted sub-sequences, the sign adjustments determined by a sign sequence of a set of M sign sequences, the system comprising:
- a serial-to-parallel converter responsive to the received sequence, over-sampled at R times the chip rate of the received sequence, and operable to provide R phase-adjusted chip-rate sequences;
- R chip-rate correlators, each operable to produce M chip-rate correlations between a phase-adjusted chip-rate sequence and the M reference sequences; and
- M phase selectors, each responsive to R chip-rate correlations for a reference sequence of the M reference sequences and operable to select a chip-rate correlation for which a metric of the chip-rate correlation is maximized, where the chip-rate correlation selected facilitates wireless communication.

12. An electronic device comprising:
- a receiver operable to recover a received sequence from a received communication signal;
- a correlator operable to determine a cross-correlation between a reference sequence and the received sequence, the reference sequence comprising a set of sub-sequences that have been sign-adjusted and concatenated, the sign adjustments determined by a first sign sequence of a plurality of sign sequences, the correlator comprising:
  - a plurality of shift modules operable to shift the received sequence by an amount dependent upon a length of the sub-sequences to provide a plurality of shifted received sequences;
  - a plurality of partial correlators operable to form a plurality of partial cross-correlations by correlating a shifted received sequences with a sub-sequence;
  - at least one combiner operable to adjust signs of the plurality of partial cross-correlations in accordance with the first sign sequence and sum the sign adjusted partial correlations to provide the cross-correlation between the reference sequence and the received sequence; and
- a processor operable to process the received sequence dependent upon the cross-correlation between the reference sequence and the received sequence for use during wireless communication, where the reference sequence comprises an alternating concatenation of sign-adjusted Golay complementary pair sub-sequences.

13. An electronic device for determining a cross-correlation between a reference sequence and a received sequence in a wireless communication system, the reference sequence comprising a set of sub-sequences that have been sign-adjusted and concatenated, the sign adjustments determined by a first sign sequence, the device comprising a chip-rate correlator that comprises:
- a plurality of shift modules operable to shift the received sequence to provide a plurality of time shifted sequences;
- a plurality of correlators operable to form a set of partial cross-correlations by cross-correlating the plurality of time shifted sequences with sub-sequences of the set of sub-sequences; and
- a combiner operable to adjust the signs of the plurality of partial cross-correlations using the first sign sequence and combine the sign adjusted partial cross-correlations to produce the cross-correlation between the reference sequence and the received sequence, where the cross-correlation is used by the wireless communication system to facilitate wireless communication.

14. A non-transitory computer-readable medium having processor-executable instructions that, when executed by a processor, cause the processor to perform a method for determining a cross-correlation between a reference sequence and a received sequence in a wireless communication system, the reference sequence comprising a set of sub-sequences that have been sign-adjusted and concatenated, the sign adjustments determined by a first sign sequence, the method comprising:
- oversampling the received sequence compared to the chip rate of the received sequence;
- forming a plurality of parallel chip-rate phases from the oversampled received sequence;
- cross-correlating the plurality of parallel chip-rate phases with the reference sequence to provide a plurality of correlations;
- determining the phase of a strongest correlation of the plurality of correlations in accordance with a metric; and
- processing the plurality of correlations dependent upon the phase of the strongest correlation.

15. The non-transitory computer-readable medium of claim 14, where the reference sequence comprises a set of sub-sequences that have been sign-adjusted and concatenated, the sign adjustments determined by a first sign sequence, and where, in the method performed by the processor, cross-correlating the plurality of parallel chip-rate phases with the reference sequence to provide the plurality of correlations comprises:
- shifting the received sequence to provide a plurality of time shifted sequences;
- cross-correlating the plurality of time shifted sequences with sub-sequences of the set of sub-sequences to form a set of partial cross-correlations;
- sign-adjusting the partial cross-correlations using the first sign sequence; and
- combining the sign-adjusted partial cross-correlations to produce the cross-correlation between the reference sequence and the received sequence, where the cross-correlation is used by the wireless communication system to facilitate wireless communication.

16. The non-transitory computer-readable medium of claim 14, where the reference sequence comprises an alternating concatenation of sign-adjusted Golay complementary pair sub-sequences.

* * * * *